Sept. 20, 1949.   H. R. PETERSON ET AL   2,482,203
ELECTRIC MOTOR DRIVE AND CONTROL FOR WHEEL CHAIRS
Filed Aug. 16, 1946   3 Sheets-Sheet 1

INVENTOR.
HAROLD R. PETERSON
FRED H. JOCK
BY
ATTORNEY

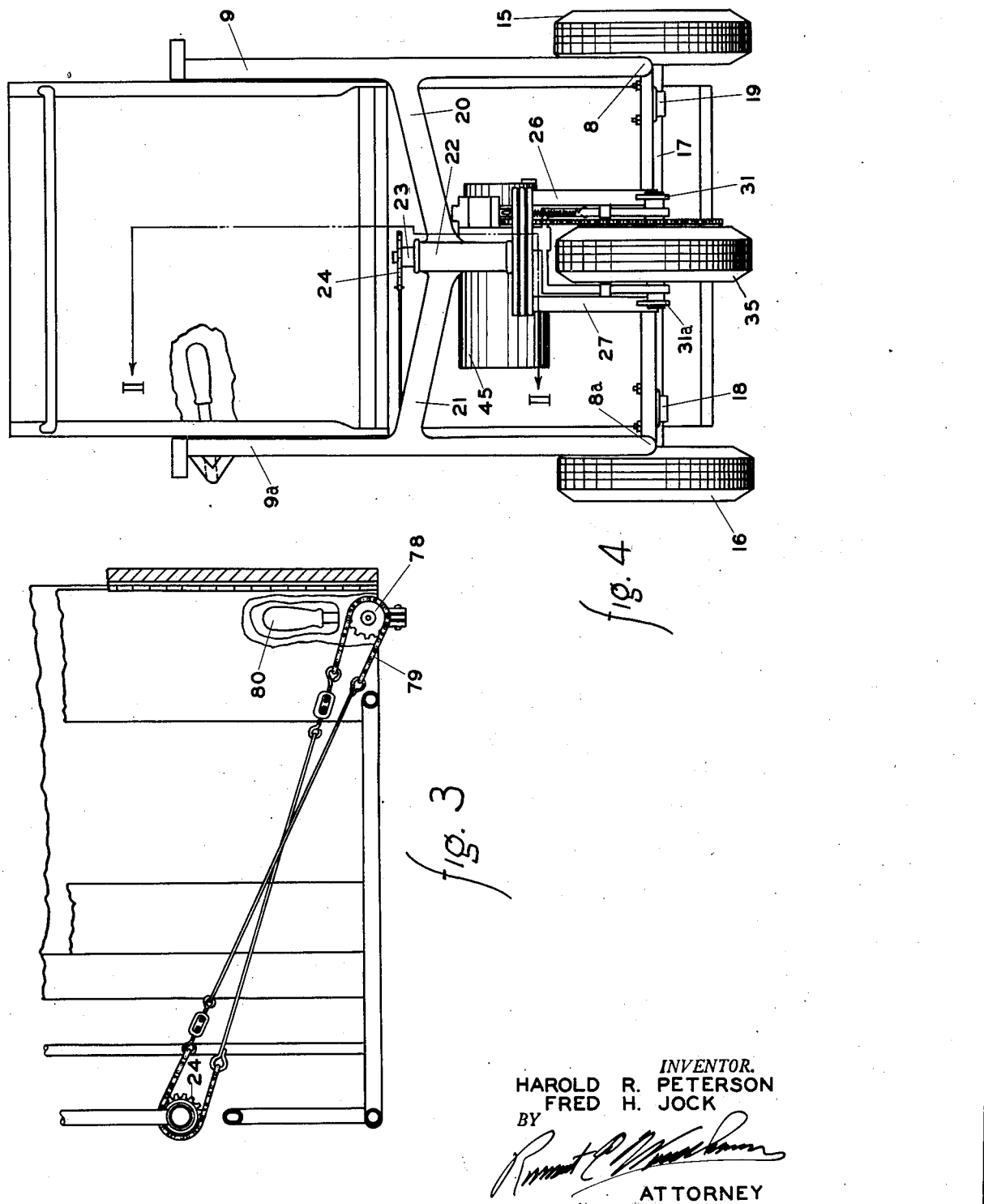

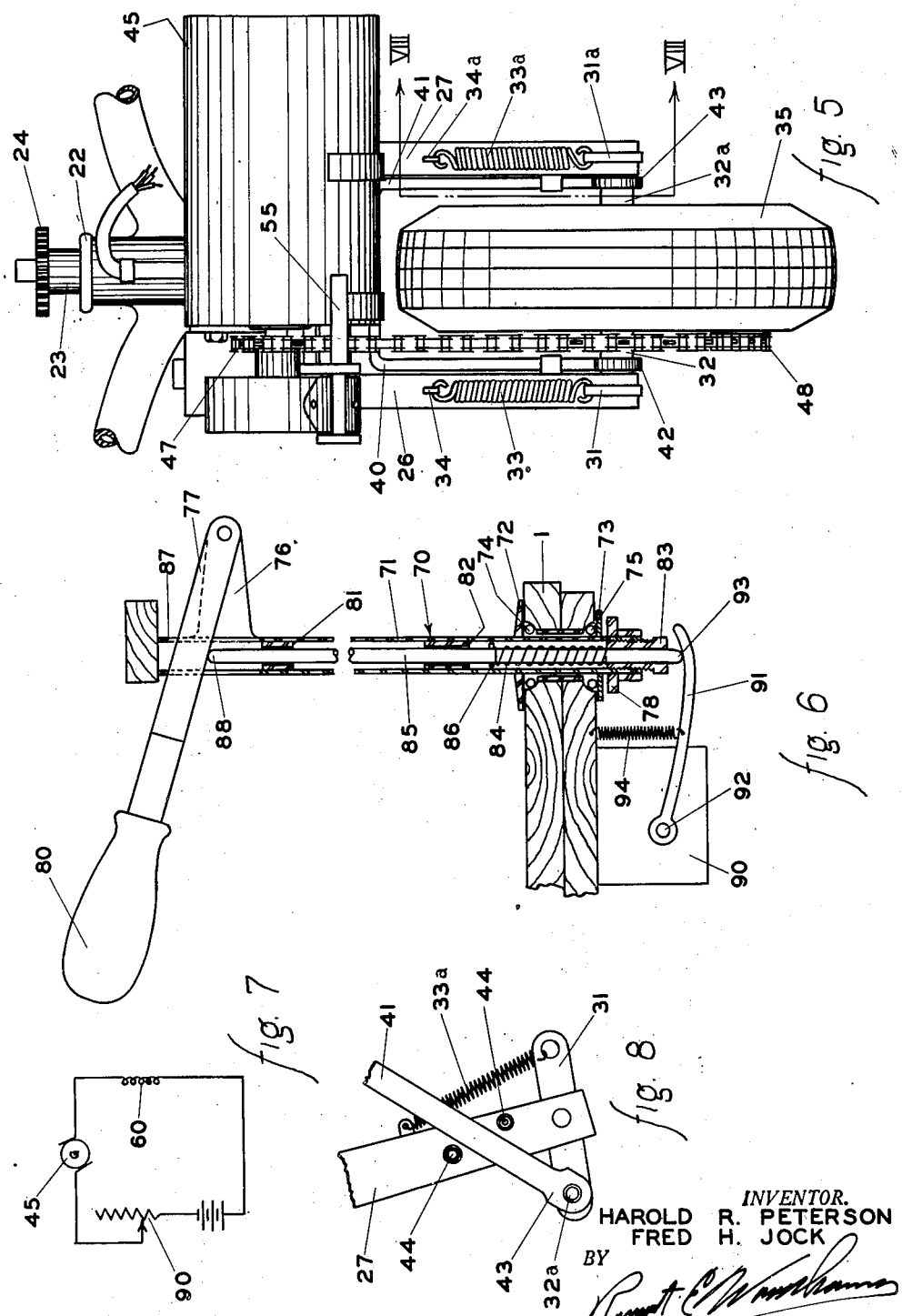

Patented Sept. 20, 1949

2,482,203

UNITED STATES PATENT OFFICE 2,482,203

ELECTRIC MOTOR DRIVE AND CONTROL FOR WHEEL CHAIRS

Harold R. Peterson and Fred H. Jock, Flint, Mich.

Application August 16, 1946, Serial No. 690,847

3 Claims. (Cl. 180—65)

This invention refers to a wheel chair and particularly to a type thereof which is motor driven and fully controllable by a single handle element.

While motor driven wheel chairs have been provided in the past there has never, for one reason or another, been provided one which is of sufficient simplicity to be easily and safely handled by the average wheel chair occupant. Usually the controls have been too complex, or too numerous, for the wheel chair occupant to handle effectively, and hence in the past such wheel chairs have often been a source of confusion and danger rather than a source of ease and comfort.

Therefore, it is herein proposed to provide a wheel chair in which all functions of starting and stopping steering and braking are controlled solely through movement of a single handle.

Accordingly, a principal object of the invention is to provide a wheel chair of the motor driven type, wherein all operations of stopping and starting the motor, controlling its speed, steering and braking are all performed through the manipulation of a single control handle.

A further object of the invention is to provide a wheel chair of the motor driven type, as aforesaid, in which the controlling operation from such handle will be definite and positive and will be free from confusion.

A further object of the invention is to provide a motor driven wheel chair as aforesaid in which the parts are of sufficient simplicity to make possible economical fabrication.

A further object of the invention is to provide a wheel chair of the motor driven type as aforesaid in which the parts are of sufficient simplicity that they will not require precise or complex adjustment and hence will not readily get out of order or preferred adjusted position.

A further object of the invention is to provide a wheel chair of the type aforesaid which will be strong and sturdy in order to withstand long and rigorous use.

Further objects and purposes of the invention will be apparent to persons acquainted with equipment of this type upon reading the following disclosure and inspecting the accompanying drawings.

In the drawings:

Figure 1 presents a side elevation view of the wheel chair.

Figure 3 is a fragmentary bottom-plan view, partially in section, the section being taken on line III—III of Figure 1.

Figure 4 is a rear elevation of the wheel chair.

Figure 5 is a detail on an enlarged scale showing a front view of the motor and driving wheel assembly.

Figure 6 is an enlarged detail of the control column taken in central section of said column in which, however, the upper part of the figure has been rotated 90° with respect to the lower part of the figure for a better showing of the functional relationships of the parts.

Figure 7 is a schematic wiring diagram.

Figure 8 is a section taken on the line VIII—VIII in Figure 5.

In providing a wheel chair meeting the objects and purposes above set forth, we have provided a chair supported upon two forward wheels of fixed direction and one rearward, swivelly mounted, wheel which comprises both the driving, or traction, wheel and the steering wheel. Held above said driving wheel by a suitable support is the motor driving mechanism and the braking mechanism, all controlled from the control post mounted in a forward corner of the chair where it is readily available for operation.

Figure 1:
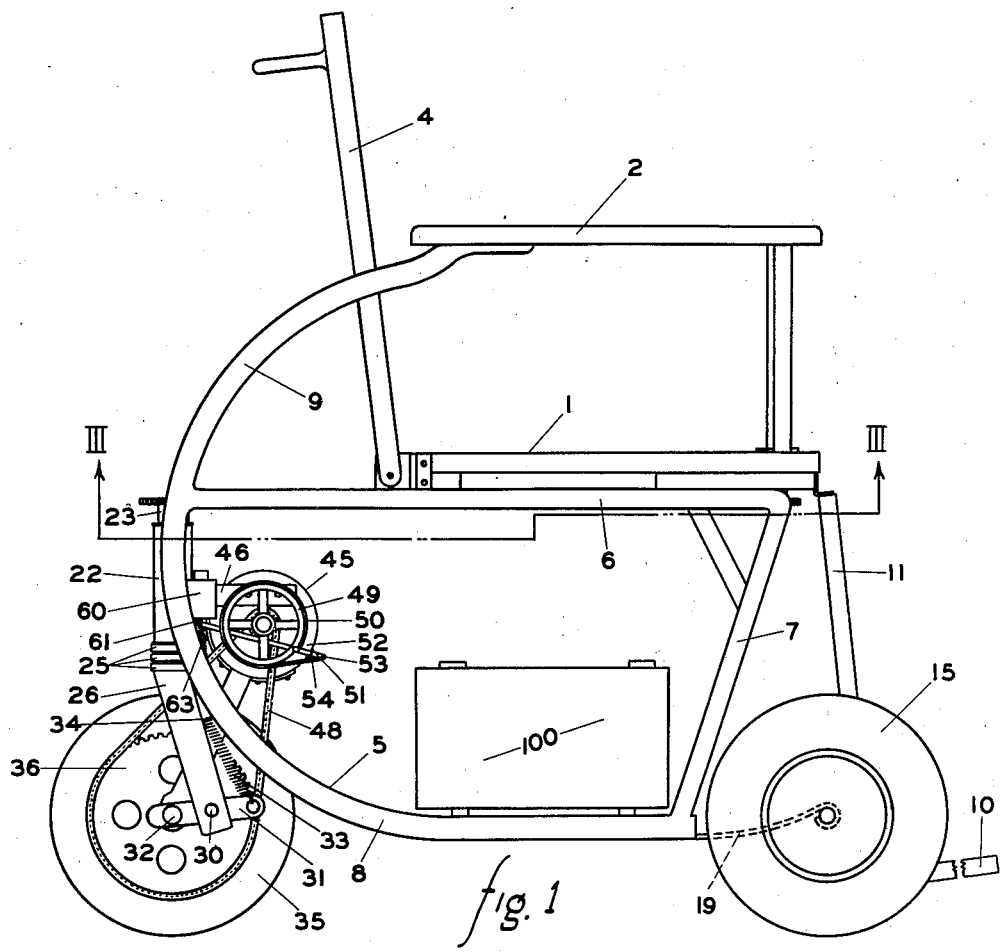
Figure 2:
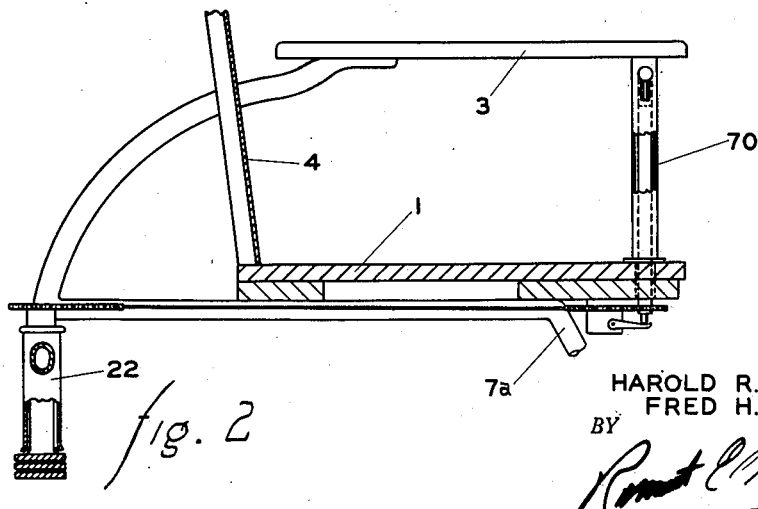
Figure 2 is an elevation, partially in section, the section portion being taken on line II—II of Figure 4.

Referring now in detail to the drawings, in Figure 1 there is shown in general a wheel chair which may be of any convenient construction, which here appears as comprising a seat 1 having arms 2 and 3, a back 4 for easy adjustment with respect to said seat by any convenient and conventional means (not shown) and a supporting frame 5 comprising a seat-supporting portion 6, front wheel supporting parts 7 and 7a, bottom and rear members 8 and 8a and back and arm supporting members 9 and 9a. A foot supporting part 10 and its associated frame 11 may also be provided according to conventional construction.

The front wheels 15 and 16 are mounted on an axle 17 which is supported on the frame by springs 18 and 19.

At the back of the chair, a pair of frame members, preferably tubular, 20 and 21 extend inwardly of the chair from the bottom and rear frame members 9 and 8a and support the swivel mounting member 22. This member comprises a vertically arranged bearing through which extends the swivel pin 23 rotatably positioned therein. On the upper end of said pin, there is fixed the sprocket 24 for purposes appearing hereinafter. At the lower end of said swivel pin there is mounted a conventional yoke comprised of a horizontal member 25, and two vertical members 26 and 27. At the lower end of the vertical wheel supporting member 26 is held the balance pin 30. Mounted substantially horizontally on said balance pin is a horizontal wheel supporting member 31 to which on one end is rotatably mounted one end of the wheel shaft 32 and on the other end is affixed one end of a relatively heavy coil spring 33. The other end of said spring is affixed at 34 to a part of the wheel supporting member 26. The drive wheel 35 is rotatably mounted on the shaft 32. All these wheel mounting elements last described have counter parts on the other side of the swivel wheel 35, which parts are designated by the numerals 30a to 34a inclusive. The extended axis of the swivel pin 23 passes through the rotative axis of the drive wheel 35.

Mounted on and fixedly with respect to the swivel wheel 35 is a driving sprocket 36 located as best shown in Figure 5 between the supporting member 26 and the swivel wheel. Placed between the driving sprocket and the support 26 on the one side, and between the driving wheel and the support 27 on the other side, are a pair of motor supporting elements 40 and 41 themselves supported at their lower ends 42 and 43 on parts 32 and 32a of the swivel wheel shaft. To hold the motor fixed with respect to the mounting post bearing 22 there is provided, as best shown in Figure 8, a pair of pins 44 on each of the wheel supporting members 26 and 27, located on the side of each thereof nearest the drive wheel 35 and placed both above and below the motor supporting elements. Other means may, of course, be readily substituted for this purpose without altering the scope or nature of the invention. The pins may be fixed or include rollers as illustrated.

Affixed to the motor shaft is a sprocket 47 which is operatively connected by a chain 48 to the driving sprocket 36. On an extension of said shaft there is a brake wheel 49 surrounded by a brake band 50. This brake band is fastened at each of its ends to a braking arm 51 at the spaced points 52 and 53. The braking arm is itself pivotally supported at 54, namely, a point between the said points 52 and 53 by a supporting arm 55 mounted in any convenient manner on the motor housing.

Firmly mounted by the bracket 46 to the motor housing is a solenoid 60 whose core 61 is operatively connected to the operating end of the braking arm 51. A spring 63 is fastened at any convenient point on the motor support at its one end and is fastened at its other end to the braking arm in a manner to urge it downwardly. It will be observed that the downward urging of the braking arm by the spring will cause it to turn around the pivot point 54 by which to draw the brake band 50 tightly around the braking wheel 49. Energizing the solenoid will lift the solenoid core 61 against said spring and release said brake.

At any convenient forward part of the wheel chair there is provided the control post generally indicated at 70. This control post comprises a tubular member 71 held by plates 72 and 73 against vertical movement with respect to the seat 1 of the wheel chair but permitting rotative movement with respect thereto on the bearings 74 and 75 suitably mounted as convenient. An arm 76 extends sidewardly from the tubular member 71, at the end of which arm is pivotally mounted the control arm 77. At a point near the lower end of the said tubular member 71 there is a sprocket 78 affixed thereto in non-rotative relationship therewith. An operating connection comprising a chain, or a combination of a pair of chain elements and a pair of connecting rods, and indicated generally by the numeral 79, operatively connects the sprocket 78 with the sprocket 24, whereby actuation of the control arm 77 through the handle 80 in a forwardly and backwardly direction for rotating the tubular member 71 by which to rotate the sprocket 78 will act through the connecting member 79 to rotate the sprocket 24 and thereby the swivel, or drive wheel 35 around the axis extended of the swivel pin 23. Thus a pushing and pulling in a forwardly and backwardly direction of the handle 80 will steer the chair.

Fixed within said tubular member 71 are the control rod guides 81 and 82 and 83, the latter being preferably in the form of a threaded plug to close a bottom end of said tubular member and to provide a rest for the spring 84. Said spring surrounds the control rod 85 resting its one end against the plug 83 and its other end against a collar 86 fixed with respect to said control rod, by which the control rod is normally held in its uppermost position. The tension of such spring may be somewhat adjusted by adjusting the position of said plug 83 with respect to said tubular member 71. The control member 77 extends through a suitable slot 87 in the tubular member 71 by which its lower side may rest against the upper end 88 of the control rod 85. Thus downward movement of the control handle 80 will move the control rod 85 downwardly against said spring 84, but release of the downward force on the control handle will enable the spring 84 to move the control rod and said handle again to its uppermost position. An electrical control box 90, usually comprising a resistance rheostat, is affixed below the seat portion 1 of the wheel chair and has a pivoted operating arm 91 extending from a pivot point 92 to the lower end 93 of the control rod 85. The control rod is so associated with said control arm that downward movement of said control rod will move the control arm downwardly and a spring 94 is provided to move said arm back upwardly when said control rod 85 moves upwardly. The strength of this spring 94 is selected according to the desire of the operator and affords, along with the adjustment provided by the plug 83, ample opportunity to fit to the wheel chair user the amount of total upward resilient urging of the operating handle 80.

A battery, or batteries, 100 may be provided of convenient and practical type and size, mounted on any convenient means supported by the frame member 8 and its counterpart on the other side of the chair. The battery, or batteries, are connected in any conventional manner to the driving motor 45 through the control box 90. Said box is constructed and connected in such a manner that when the control arm 91 is in its uppermost position there is no power flowing through the motor, and as the control arm is moved downwardly a progressively greater amount of power is applied to the motor. The coil of the solenoid 60 is connected in series with the motor so that it is energized simultaneously with the energizing of the motor and it is de-energized simultaneously with the de-energizing of the motor. A typical wiring diagram appears in Figure 7.

Operation

The operation of the foregoing described wheel chair has been indicated above and may be here summarized. With the control handle 80 in its uppermost position as shown in Figure 6, the arm 91 is likewise in its uppermost position and no power is flowing through the motor. As the handle is pressed downwardly it will act on the rod 85 to move the control arm 91 downwardly and supply power to both the solenoid 60 and to the motor 45. As the power is supplied to the solenoid it will raise the brake arm 51 and release the brake band 50 from its gripping position with respect to the brake wheel 49. Concurrently the motor will be energized to act through the chain 48 to rotate the driving wheel 35. The chair will thus move forwardly.

It is steered from side to side by pushing the control handle 80 forwardly or backwardly as above described, by which to rotate the sprocket 78 and through the chain 79 rotate the sprocket 24 which will rotate the pin 23 on its axis and thus effect steering of the chair. When the force depressing the handle 80 is removed, accidentally or otherwise, the springs 84 and 94 will move the control rod 85, and by it the said handle, to its upward position and the spring 94 will return the switch controlling arm 91 to its upwardly position, thus terminating the supply of power to both the motor and the solenoid 60. The solenoid thus being de-energized, the brake spring 63 will pull the braking arm again downwardly to tighten the brake band 50 around the brake drum 49 in the manner above-described. This is not only a convenient but an important safety feature, for the wheel chair is thus brought to an immediate stop and held firmly against further motion whenever its occupant stops pressing downwardly on the control handle. For patients who may possibly become unconscious during operation of the chair, this is a feature of greatest importance.

As a convenient refinement of the foregoing described mechanism, but not essential to the scope of the invention, reversing means may be provided by the addition of a suitable switch to the control box 90 in any conventional and known manner.

Many variations in design details of the wheel chair above disclosed and described will be apparent to those acquainted with equipment of this sort but such details will be included within the scope of our invention excepting as the hereinafter appended claims expressly provide otherwise.

We claim:

1. In a self-propelled wheel chair construction, the combination comprising: a frame having front and rearward ends and a seat supported by said frame; a pair of front wheels supporting the front end of said frame and a vertically swiveled wheel supporting the rearward end of said frame and having an upwardly extending swivel shaft; a battery carried by said frame and a motor driving said swiveled wheel; gear means on said swivel shaft; a hollow control rod tube vertically and rotatably mounted near a front corner of said frame, a control rod within said tube and means contained therein for supporting said control rod for vertically sliding relationship therewith and resilient means associated therewith for urging said rod upwardly; an operating handle on said tube at its upper end for rotating said tube and also contacting said rod for urging it downwardly against the urging of said resilient means; gear means on said tube at its lower end and power transfer means connecting said last-named gear means to said first named gear means; electrical current regulating means having actuating means, said regulating means mounted on said frame in such relationship to said control rod that said actuating means will be moved in current increasing direction with downward movement of said rod against said resilient means; means returning said actuating means in current decreasing direction with upward movement of said rod; electrical connecting means operatively associating said battery, motor and regulating means, whereby upward and downward movement of said control rod will regulate the speed of said motor; said parts all being so arranged that horizontal movement of said handle will steer said chair, vertical movement of said handle will control the speed of said chair and upon release of downward pressure on said handle said chair will automatically stop.

2. The combination claimed in claim 1 wherein said handle has means at its one end to facilitate grasping thereof by its user, is pivoted at the other end to the outside of said control tube and contacts the upper end of the control rod at a point intermediate its ends, whereby said handle may be readily lifted to a vertical position to facilitate the entry into, or leaving from, said chair by its user.

3. In a self-propelled wheel chair construction, having a frame having front and rearward ends and a seat supported by said frame; a pair of front wheels supporting the front end of said frame and a vertically swiveled wheel supporting the rearward end of said frame and having an upwardly extending swivel shaft; a battery carried by said frame and a motor driving said swiveled wheel; gear means on said swivel shaft; and means manually operable by a person sitting in the seat of said chair for steering same and controlling its speed, the improvement in said last named means comprising: a hollow control rod tube vertically and rotatably mounted near a front corner of said frame, a control rod within said tube and means contained therein for supporting said control rod for vertically sliding relationship therewith and resilient means associated therewith for urging said rod upwardly; an operating handle on said tube at its upper end for rotating said tube and also contacting said rod for urging it downwardly against the urging of said resilient means; gear means on said tube at its lower end and power transfer means connecting said last-named gear means to said first named gear means; electrical current regulating means having actuating means, said regulating means mounted on said frame in such relationship to said control rod that said actuating means will be moved in current increasing direction with downward movement of said rod against said resilient means; means returning said actuating means in current decreasing direction with upward movement of said rod; electrical connecting means operatively associating said battery, motor and regulating means, whereby upward and downward movement of said control rod will regulate the speed of said motor; said parts all being so arranged that horizontal movement of said handle will steer said chair, vertical movement of said handle will control the speed of said chair and upon release of downward pressure on said handle said chair will automatically stop.

HAROLD R. PETERSON.
FRED H. JOCK.

REFERENCES CITED

The following references are of record in the file of this patent:

UNITED STATES PATENTS

| Number | Name | Date |
|---|---|---|
| 598,314 | Crowdus | Feb. 1, 1898 |
| 680,602 | Lieb | Aug. 13, 1901 |
| 751,231 | Walters | Feb. 2, 1904 |
| 1,540,170 | Frick | June 2, 1925 |
| 2,306,042 | Custer | Dec. 22, 1942 |
| 2,399,605 | Schroeder | Apr. 30, 1946 |

FOREIGN PATENTS

| Number | Country | Date |
|---|---|---|
| 18,783 | Great Britain | 1896 |
| 529,814 | Great Britain | Nov. 28, 1940 |